United States Patent
Boyd et al.

(10) Patent No.: US 7,519,650 B2
(45) Date of Patent: Apr. 14, 2009

(54) SPLIT SOCKET SEND QUEUE APPARATUS AND METHOD WITH EFFICIENT QUEUE FLOW CONTROL, RETRANSMISSION AND SACK SUPPORT MECHANISMS

(75) Inventors: William Todd Boyd, Poughkeepsie, NY (US); Jean L. Calvignac, Cary, NC (US); Chih-Jen Chang, Apex, NC (US); Douglas J. Joseph, Danbury, CT (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 10/235,689

(22) Filed: Sep. 5, 2002

(65) Prior Publication Data

US 2004/0049601 A1    Mar. 11, 2004

(51) Int. Cl.
  *G06F 15/16* (2006.01)
(52) U.S. Cl. ........................... 709/200; 709/230
(58) Field of Classification Search ................ 709/230, 709/200
  See application file for complete search history.

(56) References Cited

U.S. PATENT DOCUMENTS

| | | | | |
|---|---|---|---|---|
| 5,937,169 | A * | 8/1999 | Connery et al. | 709/250 |
| 6,034,963 | A | 3/2000 | Minami et al. | 370/401 |
| 6,427,171 | B1 * | 7/2002 | Craft et al. | 709/230 |
| 7,007,103 | B2 * | 2/2006 | Pinkerton et al. | 709/238 |
| 2002/0156927 | A1 * | 10/2002 | Boucher et al. | 709/250 |
| 2003/0002497 | A1 * | 1/2003 | Vasudevan | 370/389 |
| 2003/0191857 | A1 * | 10/2003 | Terrell et al. | 709/244 |
| 2004/0042464 | A1 * | 3/2004 | Elzur et al. | 370/395.52 |

\* cited by examiner

*Primary Examiner*—John Follansbee
*Assistant Examiner*—Alan S Chou
(74) *Attorney, Agent, or Firm*—Yee & Associates, P.C.; Casimer K. Salys

(57) ABSTRACT

A mechanism for offloading the management of send queues in a split socket stack environment, including efficient split socket queue flow control and TCP/IP retransmission support. As consumers initiate send operations, send work queue entries (SWQEs) are created by an Upper Layer Protocol (ULP) and written to the send work queue (SWQ). The Internet Protocol Suite Offload Engine (IPSOE) is notified of a new entry to the SWQ and it subsequently reads this entry that contains pointers to the data that is to be transmitted. After the data is transmitted and acknowledgments are received, the IPSOE creates a completion queue entry (CQE) that is written into the completion queue (CQ). After the CQE is written, the ULP subsequently processes the entry and removes it from the CQE, freeing up a space in both the SWQ and CQ. The number of entries available in the SWQ are monitored by the ULP so that it does not overwrite any valid entries. Likewise, the IPSOE monitors the number of entries available in the CQ, so as not overwrite the CQ. The flow control between the ULP and the IPSOE is credit based. The passing of CQ credits is the only explicit mechanism required to manage flow control of both the SWQ and the CQ between the ULP and the IPSOE.

28 Claims, 14 Drawing Sheets

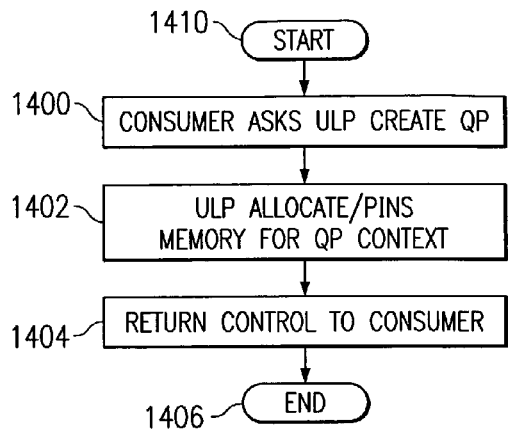
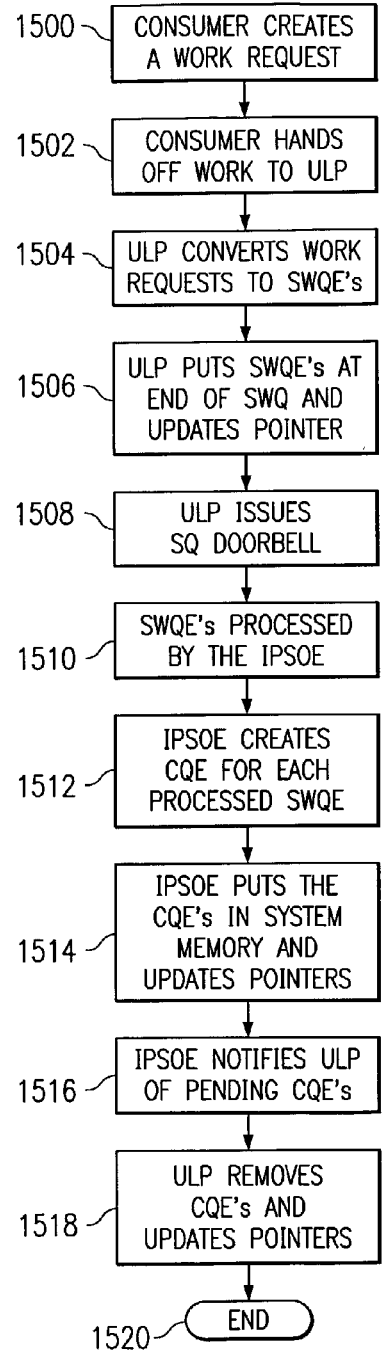
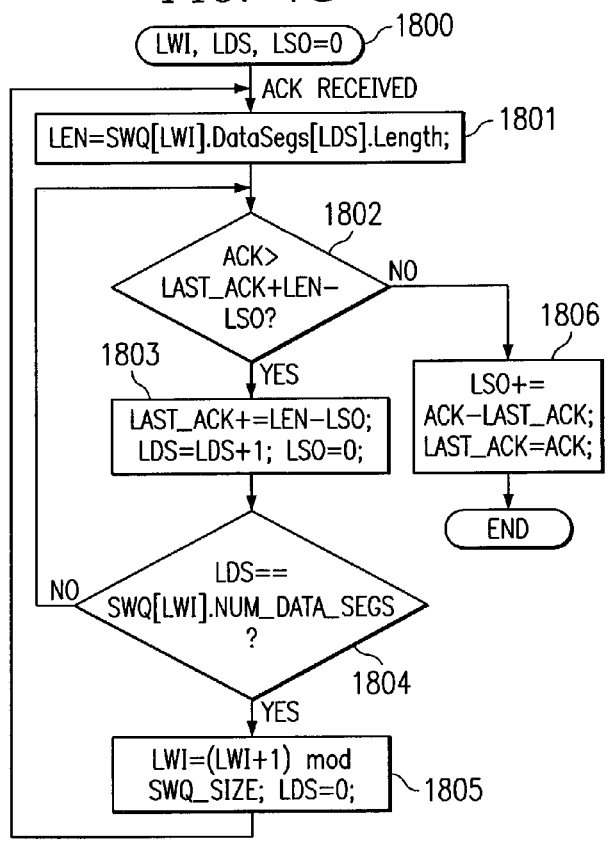

SPLIT SOCKET SEND QUEUE APPARATUS AND METHOD WITH EFFICIENT QUEUE FLOW CONTROL, RETRANSMISSION AND SACK SUPPORT MECHANISMS

BACKGROUND OF THE INVENTION

1. Technical Field

The present invention relates generally to communication protocols between a host computer and an input/output (I/O) device. More specifically, the present invention provides a hardware implementation for offloading management of a send queue. In particular, the present invention provides a mechanism by which work requests are turned into work queue entries (WQEs) and are passed from Upper Layer Protocol (e.g. sockets) software to an Internet Protocol (IP) Suite Offload Engine (IPSOE). The present invention also provides a mechanism by which completed WQEs are passed back to the Upper Layer Protocol (ULP) software. The present invention also provides a mechanism for supporting Selective Acknowledgments.

2. Description of Related Art

In an Internet Protocol (IP) Network, the software provides a message passing mechanism that can be used to communicate with input/output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through upper level protocols, such as Sockets, iSCSI, and Direct Access File System (DAFS).

Unfortunately, the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol. 4, No. 6, pp. 817-828, December 1996; and D. D. Clark, V. Jacobson, J. Romkey, H. Salwen, "An analysis of TCP processing overhead", IEEE Communications Magazine, volume: 27, Issue: 6, Jun. 1989, pp 23-29). In the future the network stack will continue to consume excessive resources for several reasons, including: increased use of networking by applications; use of network security protocols; and the underlying fabric bandwidths are increasing at a higher rate than microprocessor and memory bandwidths. To address this problem, the industry is offloading the network stack processing to a TCP/IP Offload Engine (TOE).

There are two offload approaches being taken in the industry. The first approach uses the existing TCP/IP network stack, without adding any additional protocols. This approach can offload TCP/IP to hardware, but unfortunately does not remove the need for receive side copies. As noted in the papers above, copies are one of the largest contributors to central processing unit (CPU) and memory bandwidth utilization. To remove the need for copies, the industry is pursuing the second approach that consists of adding Framing, Direct Data Placement (DDP), and Remote Direct Memory Access (RDMA) over the TCP and SCTP protocols.

Today the host CPU performs most IP suite processing. TCP/IP Offload Engines (TOE) offer a higher performance interface for communicating to other general purpose computers and I/O devices. Data sends or receives through the TOE require that the CPU either copy data from one memory location to another or register the memory so that the TOE can directly access the memory region. Each of these options requires significant CPU resources with the memory registration option being preferred for large memory transfers, however, as network speeds increase the amount of CPU resources required will increase. A simple mechanism is needed to implement Send Queue in the TOE and perform RDMA, DDP, framing, and TCP/IP processing in the TOE. The mechanism needs to maintain all RDMA, DDP, framing, TCP, IP, and Ethernet state in the TOE. It must also provide the necessary protection to support out of user space Send Queue operations. The present invention, hereinafter referred to as an Internet Protocol Suite Offload Engine (IPSOE), also provides a mechanism for supporting Selective Acknowledgments.

SUMMARY OF THE INVENTION

The present invention provides a method, computer program product, and distributed data processing system for management of a send queue in a split socket stack in order to reduce the processing overhead in host processors. Specifically, the present invention is directed to a mechanism for offloading the management of send queues in a split socket stack environment, including efficient split socket queue flow control and TCP/IP retransmission support.

With the present invention, an Upper Layer Protocol (ULP) creates send work queues and completion queues that are utilized by an Internet Protocol Suite Offload Engine (IPSOE) and the ULP to transfer information and carry out send operations. As consumers initiate send operations, send work queue entries (SWQEs) are created by the ULP and written to the send work queue (SWQ). The IPSOE is notified of a new entry to the SWQ and it subsequently reads this entry that contains pointers to the data that is to be transmitted.

After the data is transmitted and acknowledgments are received, the IPSOE creates a completion queue entry (CQE) that is written into the completion queue (CQ). The CQE includes a Work Request ID that associates a given SWQE to a CQE. After the CQE is written, the ULP subsequently processes the entry and removes it from the CQE, freeing up a space in both the SWQ and CQ. The number of entries available in the SWQ are monitored by the ULP so that it does not overwrite any valid entries. Likewise, the IPSOE monitors the number of entries available in the CQ, so as not overwrite the CQ.

The flow control between the ULP and the IPSOE is credit based. The communication of credits between the ULP and the IPSOE is partly explicit and partly implicit. This is facilitated by an assumed association between SWQ and CQ updates. The passing of CQE's by the IPSOE to the ULP implies a passing of both SWQ and CQ credits. The passing of work requests by the ULP to the IPSOE implies a passing of SWQE credits from the ULP to the IPSOE. CQ credits are passed explicitly from the ULP to the IPSOE. Thus, the passing of CQ credits is the only explicit mechanism required to manage flow control of both the SWQ and the CQ between the ULP and the IPSOE.

The IPSOE also maintains a correlation between the TCP sequence number reflected in TCP acknowledgments and the corresponding byte position in the send buffers. This allows the IPSOE to support TCP retransmission, without buffering transmitted data until the corresponding acknowledgments (or selective acknowledgments) are received. The IPSOE retransmit mechanism also supports the TCP/IP Selective Acknowledgment (SACK) option. Buffering of transmitted data by the IPSOE is avoided both with and without the SACK option enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 14 is a flowchart outlining an exemplary operation for creation of a queue pair in accordance with the present invention;

FIG. 15 is a flowchart outlining an exemplary operation of a send transaction in accordance with the present invention;

FIG. 18 is a flowchart outlining an operation of the IPSOE when a TCP/IP acknowledgment arrives.

DETAILED DESCRIPTION OF THE PREFERRED EMBODIMENT

The present invention provides a distributed computing system having endnodes, switches, routers, and links interconnecting these components. The endnodes can be Internet Protocol Suite Offload Engines or traditional host software based Internet protocol suites. Each endnode uses send and receive queue pairs to transmit and receive messages. The endnodes segment the message into frames and transmit the frames over the links. The switches and routers interconnect the endnodes and route the frames to the appropriate endnode. The endnodes reassemble the frames into a message at the destination.

Figure 1:
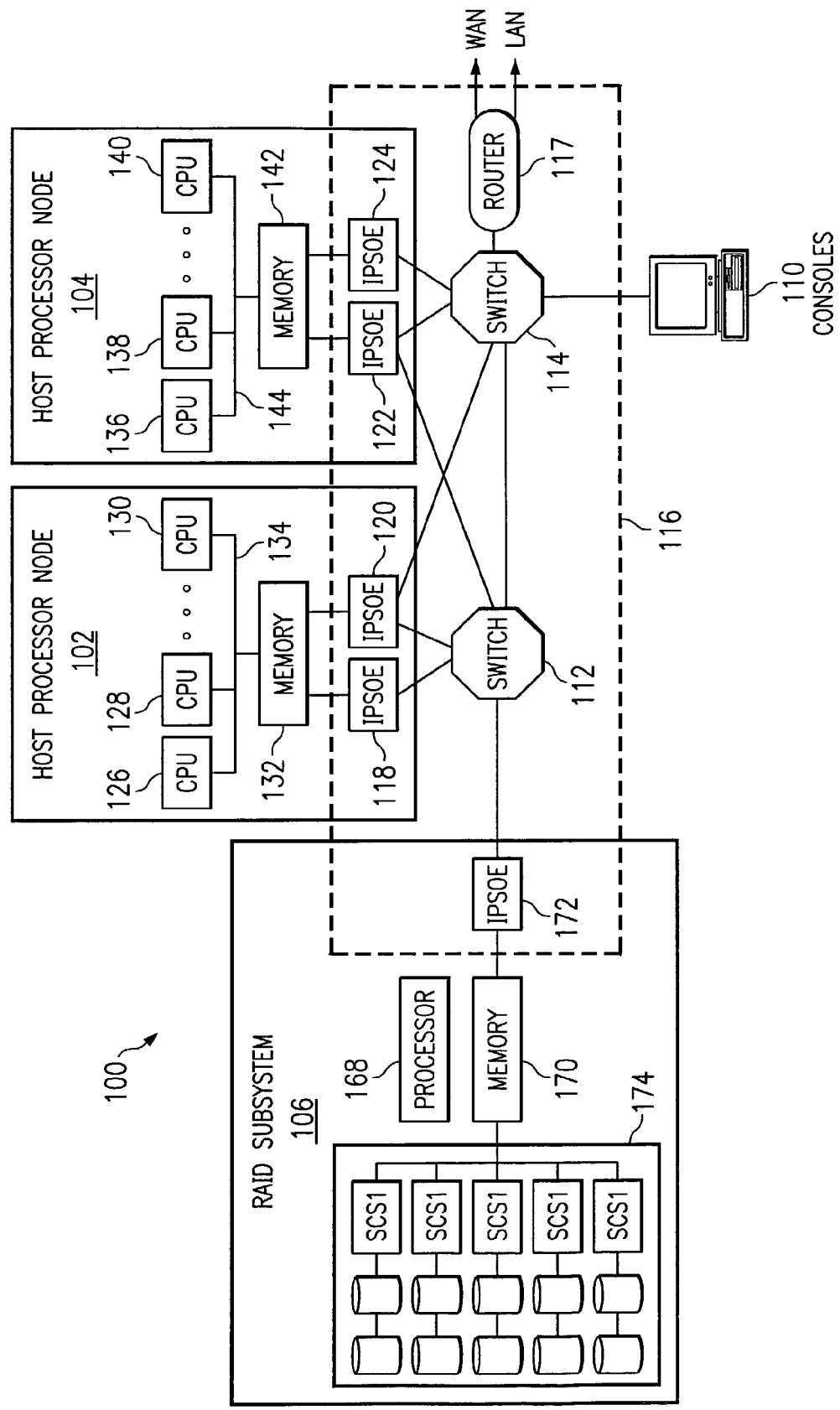
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of an Internet protocol network (IP net), such as IP net 100 and is provided merely for illustrative purposes and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

IP net 100 is a high-bandwidth, low-latency network interconnecting nodes within the distributed computer system. A node is any component attached to one or more links of a network and forming the origin and/or destination of messages within the network. In the depicted example, IP net 100 includes nodes in the form of host processor node 102, host processor node 104, and redundant array independent disk (RAID) subsystem node 106. The nodes illustrated in FIG. 1 are for illustrative purposes only, as IP net 100 can connect any number and any type of independent processor nodes, storage nodes, and special purpose processing nodes. Any one of the nodes can function as an endnode, which is herein defined to be a device that originates or finally consumes messages or frames in IP net 100.

In one embodiment of the present invention, an error handling mechanism in distributed computer systems is present in which the error handling mechanism allows for TCP or SCTP communication between endnodes in a distributed computing system, such as IP net 100.

A message, as used herein, is an application-defined unit of data exchange, which is a primitive unit of communication between cooperating processes. A frame is one unit of data encapsulated by Internet Protocol Suite headers and/or trailers. The headers generally provide control and routing information for directing the frame through IP net 100. The trailer generally contains control and cyclic redundancy check (CRC) data for ensuring frames are not delivered with corrupted contents.

Within a distributed computer system, IP net 100 contains the communications and management infrastructure supporting various forms of traffic, such as storage, interprocess communications (IPC), file access, and sockets. IP net 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the IP net fabric. The multiple ports and paths through the IP net shown in FIG. 1 can be employed for fault tolerance and increased bandwidth data transfers.

The IP net 100 in FIG. 1 includes switch 112, switch 114, and router 117. A switch is a device that connects multiple links together and allows routing of frames from one link to another link using the layer 2 destination address field. When the Ethernet is used as the link, the destination field is known as the media access control (MAC) address. A router is a device that routes frames based on the layer 3 destination address field. When Internet Protocol (IP) is used as the layer 3 protocol, the destination address field is an IP address.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types (TCP and SCTP), endnodes, such as host processor endnodes and I/O adapter endnodes, generate request frames and return acknowledgment frames. Switches and routers pass frames along, from the source to the destination.

In IP net 100 as illustrated in FIG. 1, host processor node 102, host processor node 104, and RAID subsystem node 106 include at least one IPSOE to interface to IP net 100. In one embodiment, each IPSOE is an endpoint that implements the IPSOI in sufficient detail to source or sink frames transmitted on IP net 100. Host processor node 102 contains IPSOEs in the form of host IPSOE 118 and IPSOE 120. Host processor node 104 contains IPSOE 122 and IPSOE 124. Host processor node 102 also includes central processing units 126-130 and a memory 132 interconnected by bus system 134. Host processor node 104 similarly includes central processing units 136-140 and a memory 142 interconnected by a bus system 144.

IPSOE 118 provides a connection to switch 112, while IPSOE 124 provides a connection to switch 114, and IP Suite Offload Engines 120 and 122 provide a connection to switches 112 and 114.

In one embodiment, an IP Suite Offload Engine is implemented in hardware or a combination of hardware and offload microprocessor(s). In this implementation, IP suite processing is offloaded to the IPSOE. This implementation also permits multiple concurrent communications over a switched network without the traditional overhead associated with communicating protocols. In one embodiment, the IPSOEs and IP net 100 in FIG. 1 provide the consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. In this example, RAID subsystem node 106 in FIG. 1 includes processor 168, memory 170, IP Suite Offload Engine (IPSOE) 172, and multiple redundant and/or striped storage disk unit 174.

IP net 100 handles data communications for storage, interprocessor communications, file accesses, and sockets. IP net 100 supports high-bandwidth, scalable, and extremely low latency communications. User clients can bypass the operating system kernel process and directly access network communication components, such as IPSOEs, which enable efficient message passing protocols. IP net 100 is suited to current computing models and is a building block for new forms of storage, cluster, and general networking communication. Further, IP net 100 in FIG. 1 allows storage nodes to communicate among themselves or communicate with any or all of the processor nodes in a distributed computer system. With storage attached to IP net 100, the storage node has substantially the same communication capability as any host processor node in IP net 100.

In one embodiment, the IP net 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for storage, cluster, and general networking communications. A typical storage operation employs a combination of channel and memory semantics. In an illustrative example storage operation of the distributed computer system shown in FIG. 1, a host processor node, such as host processor node 102, initiates a storage operation by using channel semantics to send a disk write command to the RAID subsystem IPSOE 172. The RAID subsystem examines the command and uses memory semantics to read the data buffer directly from the memory space of the host processor node. After the data buffer is read, the RAID subsystem employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
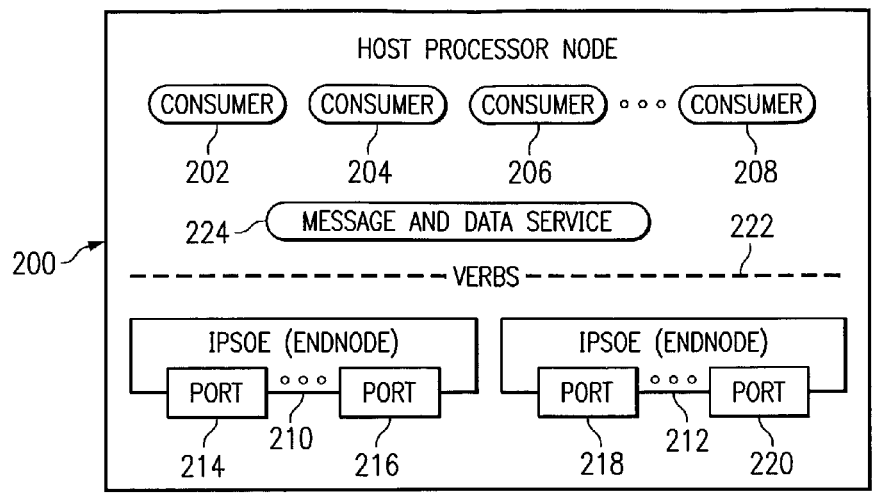
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202-208, which are processes executing on host processor node 200. Host processor node 200 also includes IP Suite Offload Engine (IPSOE) 210 and IPSOE 212. IPSOE 210 contains ports 214 and 216 while IPSOE 212 contains ports 218 and 220. Each port connects to a link. The ports can connect to one IP net subnet or multiple IP net subnets, such as IP net 100 in FIG. 1.

Consumers 202-208 transfer messages to the IP net via the verbs interface 222 and message and data service 224. A verbs interface is essentially an abstract description of the functionality of an IP Suite Offload Engine. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through IPSOE 210 and IPSOE 212. Message and data service 224 provides an interface to consumers 202-208 to process messages and other data.

Figure 3A:
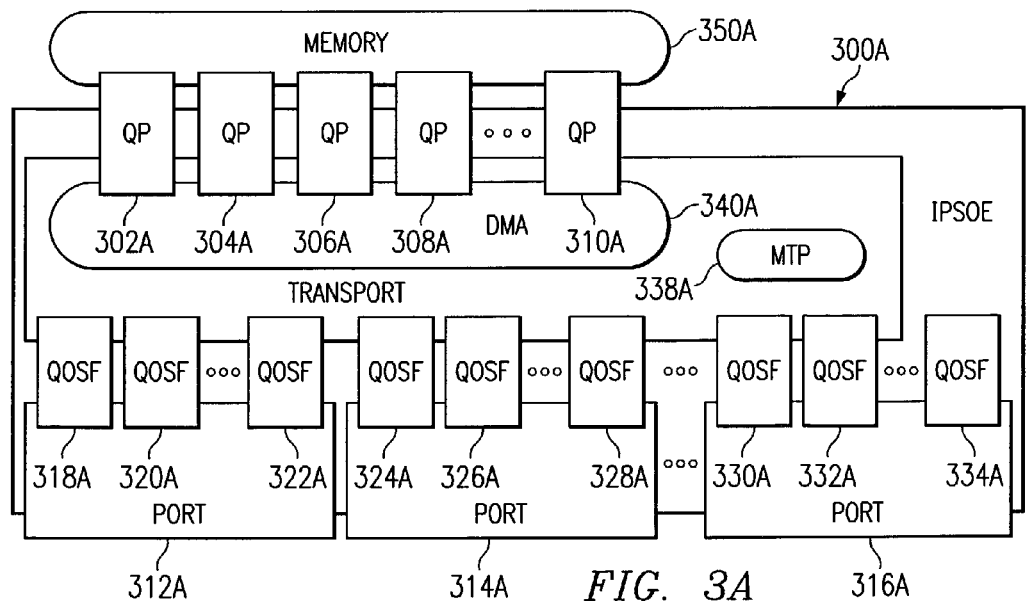
FIG. 3A is a diagram of an IP Suite Offload Engine in accordance with a preferred embodiment of the present invention.

With reference now to FIG. 3A, a diagram of an IP Suite Offload Engine is depicted in accordance with a preferred embodiment of the present invention. IP Suite Offload Engine 300A shown in FIG. 3A includes a set of queue pairs (QPs) 302A-310A, which are used to transfer messages to the IPSOE ports 312A-316A. Buffering of data to IPSOE ports 312A-316A is channeled using the network layer's quality of service field (QOSF), for example, the Traffic Class field in the IP Version 6 specification, 318A-334A. Each network layer quality of service field has its own flow control. Internet Engineering Task Force (IETF) standard network protocols are used to configure the link and network addresses of all IP Suite Offload Engine ports connected to the network. Two such protocols are Address Resolution Protocol (ARP) and Dynamic Host Configuration Protocol. Memory translation and protection (MTP) 338A is a mechanism that translates virtual addresses to physical addresses and validates access rights. Direct memory access (DMA) 340A provides for direct memory access operations using memory 350A with respect to queue pairs 302A-310A.

A single IP Suite Offload Engine, such as the IPSOE 300A shown in FIG. 3A, can support thousands of queue pairs. Each queue pair consists of a send work queue (SWQ) and a receive work queue (RWQ). The send work queue is used to send channel and memory semantic messages. The receive work queue receives channel semantic messages. A consumer calls an operating system specific programming interface, which is herein referred to as "verbs", to place work requests (WRs) onto a work queue.

Figure 3B:
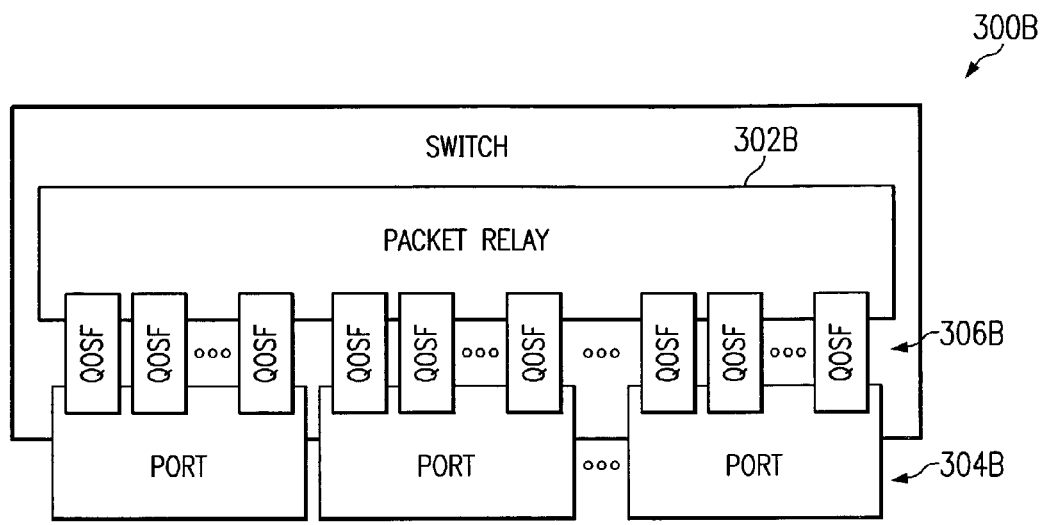
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through link or network layer quality of service fields such as IP version 4's Type of Service field 306B. Generally, a switch such as switch 300B can route frames from one port to any other port on the same switch.

Figure 3C:
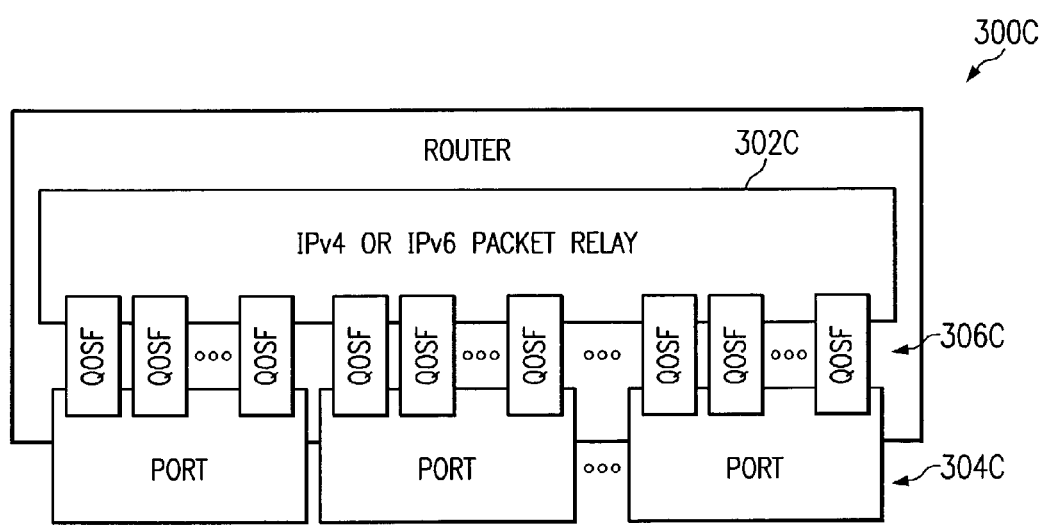
FIG. 3C is a diagram of a router in accordance with a preferred embodiment of the present invention.

Similarly, FIG. 3C depicts a router 300C according to a preferred embodiment of the present invention. Router 300C includes a frame relay 302C in communication with a number of ports 304C through network layer quality of service fields such as IP version 4's Type of Service field 306C. Like switch 300B, router 300C will generally be able to route frames from one port to any other port on the same router.

Figure 4:
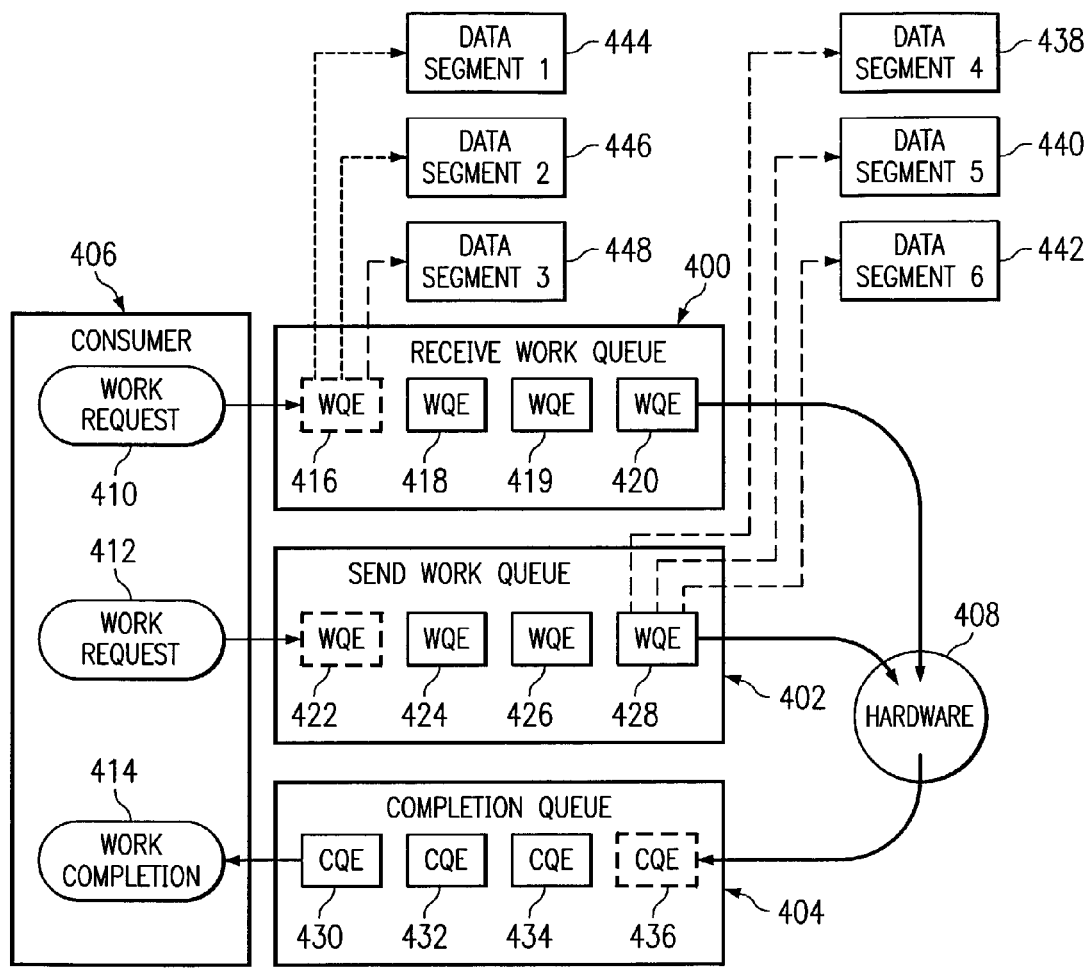
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the IP net fabric. Receive work queue 400 contains work queue elements (WQEs) 416-420, describing where to place incoming channel semantic data from the IP net fabric. A work queue element is processed by hardware 408 in the IPSOE.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. The remote virtual addresses are in the address context of the process owning the remote queue pair targeted by the RDMA read work queue element.

A RDMA write work queue element provides a memory semantic operation to write a virtually contiguous memory space on a remote node. For example, work queue element 416 in receive work queue 400 references data segment 1 444, data segment 2 446, and data segment 448. The RDMA write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. The RDMA FetchOp is not included in current RDMA over IP standardization efforts, but is described here, because it may be used as a value-added feature in some implementations.

A bind (unbind) remote access key (R_Key) work queue element provides a command to the IP Suite Offload Engine hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports three types of transport services: TCP, SCTP, and UDP.

TCP and SCTP associate a local queue pair with one and only one remote queue pair. TCP and SCTP require a process to create a queue pair for each process that TCP and SCTP are to communicate with over the IP net fabric. Thus, if each of N host processor nodes contains P processes, and all P processes on each node wish to communicate with all the processes on all the other nodes, each host processor node requires $p^2 \times (N-1)$ queue pairs. Moreover, a process can associate a queue pair to another queue pair on the same IPSOE.

Figure 5:
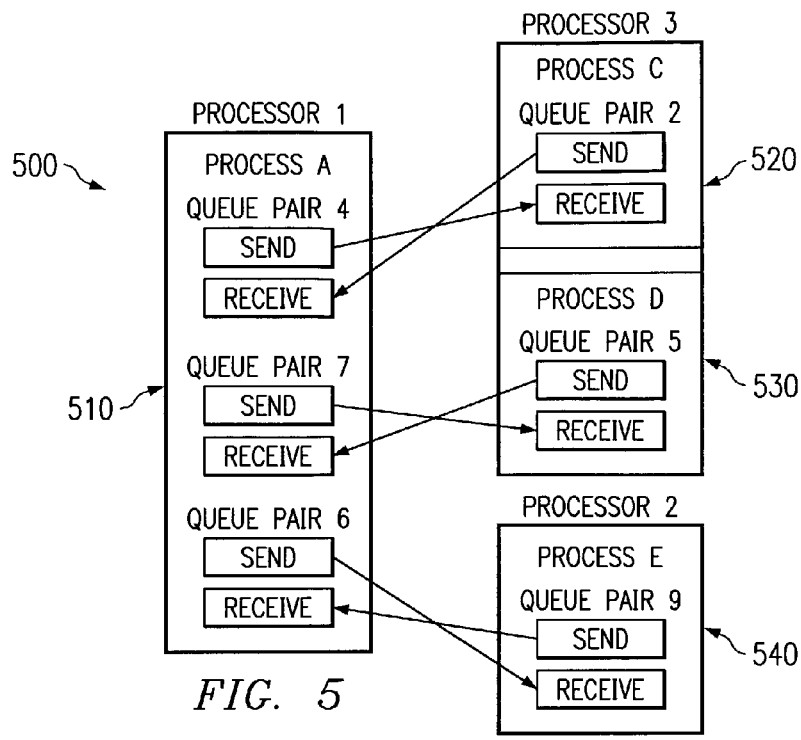
FIG. 5 is a diagram illustrating a portion of a distributed computer system in accordance with a preferred embodiment of the present invention in which a TCP or SCTP transport is used.

A portion of a distributed computer system employing TCP or SCTP to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The TCP or SCTP of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a TCP or SCTP causes data to be written into the receive memory space referenced by a receive WQE of the associated queue pair. RDMA operations operate on the address space of the associated queue pair.

In one embodiment of the present invention, the TCP or SCTP is made reliable because hardware maintains sequence numbers and acknowledges all frame transfers. A combination of hardware and IP net driver software retries any failed communications. The process client of the queue pair obtains reliable communications even in the presence of bit errors, receive underruns, and network congestion. If alternative paths exist in the IP net fabric, reliable communications can be maintained even in the presence of failures of fabric switches, links, or IP Suite Offload Engine ports.

In addition, acknowledgments may be employed to deliver data reliably across the IP net fabric. The acknowledgment may, or may not, be a process level acknowledgment, i.e. an acknowledgment that validates that a receiving process has consumed the data. Alternatively, the acknowledgment may be one that only indicates that the data has reached its destination.

The User Datagram Protocol is connectionless. The UDP is employed by management applications to discover and integrate new switches, routers, and endnodes into a given distributed computer system. The UDP does not provide the reliability guarantees of the TCP or SCTP. The UDP accordingly operates with less state information maintained at each endnode.

Figure 6:
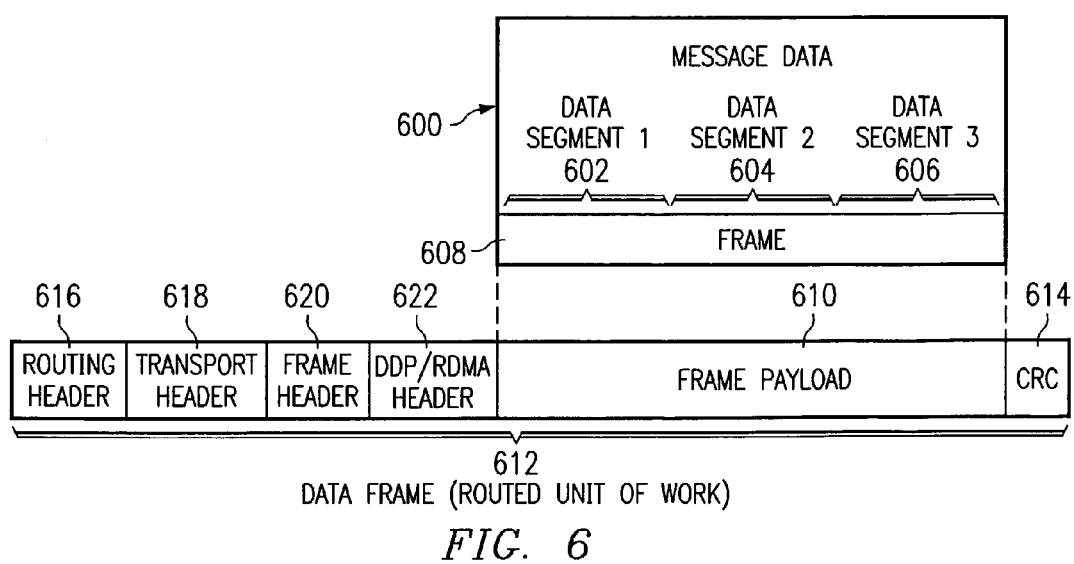
FIG. 6 is an illustration of a data frame in accordance with a preferred embodiment of the present invention.

Turning next to FIG. 6, an illustration of a data frame is depicted in accordance with a preferred embodiment of the present invention. A data frame is a unit of information that is routed through the IP net fabric. The data frame is an endnode-to-endnode construct, and is thus created and consumed by endnodes. For frames destined to an IPSOE, the data frames are neither generated nor consumed by the switches and routers in the IP net fabric. Instead for data frames that are destined to an IPSOE, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 600 contains data segment 1 602, data segment 2 604, and data segment 3 606, which are similar to the data segments illustrated in FIG. 4. In this example, these data segments form a frame 608, which is placed into frame payload 610 within data frame 612. Additionally, data frame 612 contains cyclic redundancy check (CRC) 614, which is used for error checking. Additionally, routing header 616 and transport header 618 are present in data frame 612. Routing header 616 is used to identify source and destination ports for data frame 612. Transport header 618 in this example specifies the sequence number and the source and destination port number for data frame 612. The sequence number is initialized when communication is established and increments by 1 for each byte of frame header, DDP/RDMA header, data payload, and CRC. Frame header 620 in this example specifies the destination queue pair number associated with the frame and the length of the Direct Data Placement and/or Remote Direct Memory Access (DDP/RDMA) header plus data payload plus CRC. DDP/RDMA header 622 specifies the message identifier and the placement information for the data payload. The message identifier is constant for all frames that are part of a message. Example message identifiers include, for example, send, write RDMA, and read RDMA.

Figure 7:
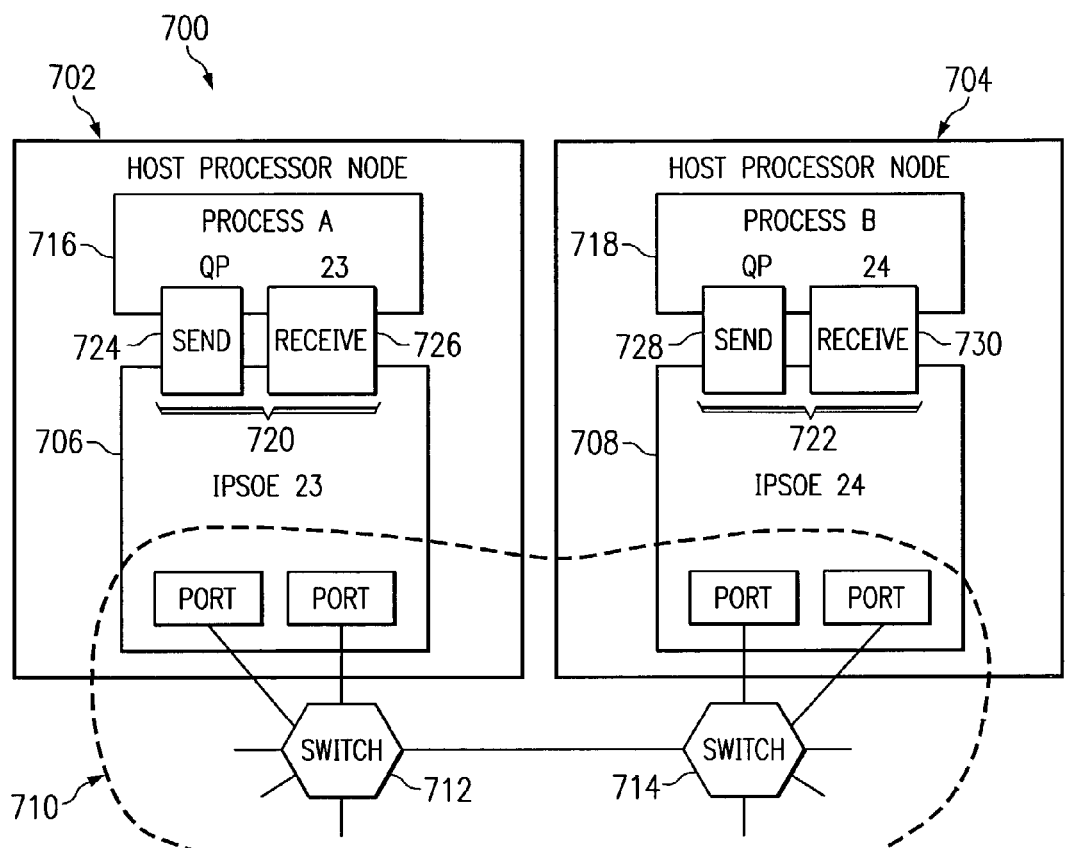
FIG. 7 is a diagram illustrating a portion of a distributed computer system in accordance with a preferred embodiment of the present invention.

In FIG. 7, a portion of a distributed computer system 700 is depicted to illustrate an example request and acknowledgment transaction. Distributed computer system 700 in FIG. 7 includes a host processor node 702 running process A 716 and a host processor node 704 running process B 718. Host processor node 702 includes an IPSOE 706. Host processor node 704 includes an IPSOE 708. The distributed computer system in FIG. 7 includes IP net fabric 710, which includes switch 712 and switch 714. The IP net fabric includes a link coupling IPSOE 706 to switch 712; a link coupling switch 712 to switch 714; and a link coupling IPSOE 708 to switch 714.

In the example transactions, host processor node 702 includes a client process A. Host processor node 704 includes a client process B. Client process A interacts with host IPSOE 706 through queue pair 23 720 comprising send queue 724 and receive queue 726. Client process B interacts with host IPSOE 708 through queue pair 24 722 comprising send queue 728 and receive queue 730. Queue pairs 23 and 24 are data structures that include a send work queue and a receive work queue.

Process A initiates a message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a part of the message, such as indicated by data segments 1, 2, and 3, which respectively hold message parts 1, 2, and 3, in FIG. 4.

Hardware in host IPSOE 706 reads the work queue element and segments the message stored in virtual contiguous buffers into data frames, such as the data frame illustrated in FIG. 6. Data frames are routed through the IP net fabric, and for reliable transfer services, are acknowledged by the final destination endnode. If not successfully acknowledged, the data frame is retransmitted by the source endnode. Data frames are generated by source endnodes and consumed by destination endnodes.

Figure 8:
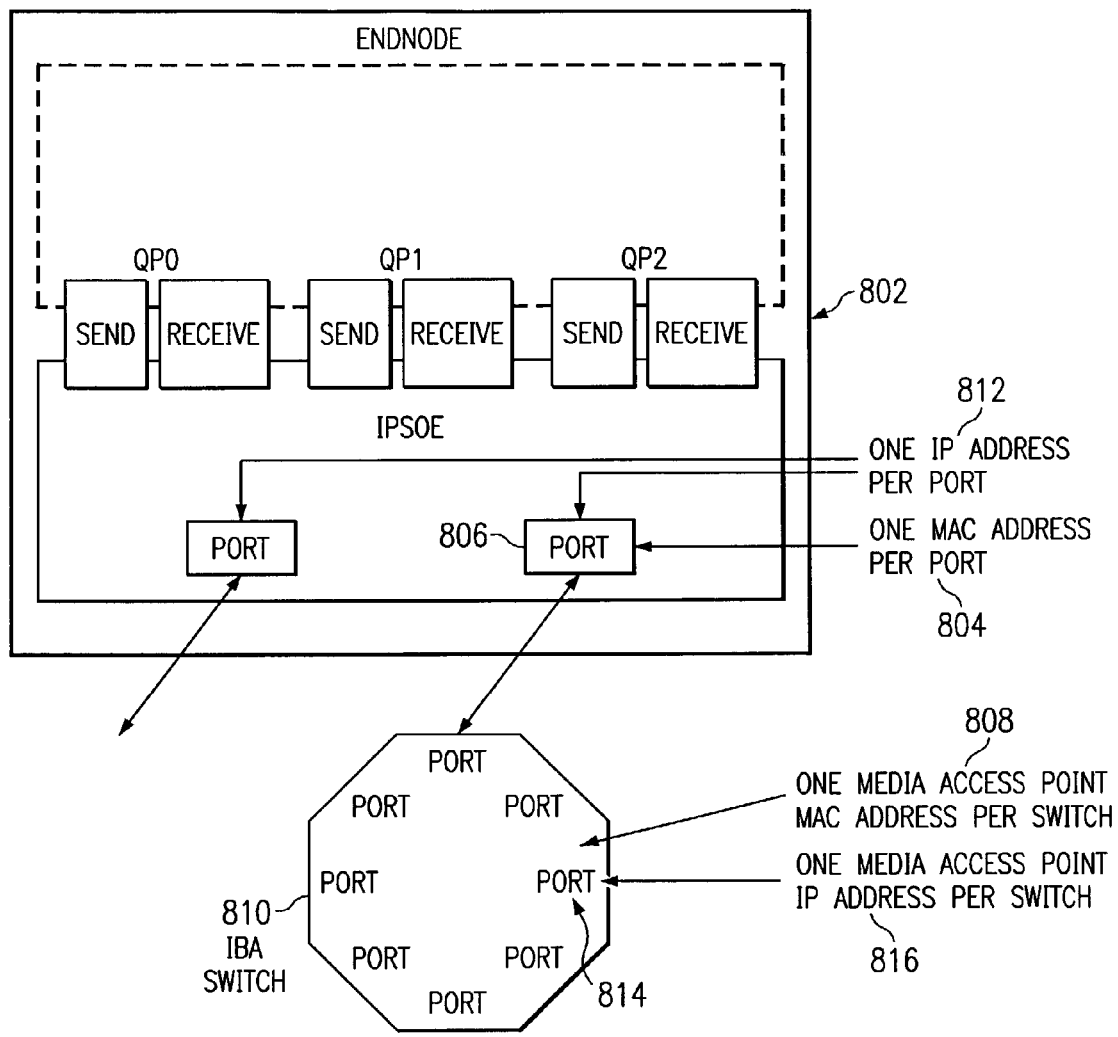
FIG. 8 is a diagram illustrating the network addressing used in a distributed networking system in accordance with the present invention.

With reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an endnode specified by the host name. Thus, there is one host name per node, but a node can have multiple IPSOEs.

A single link layer address (e.g. Ethernet Media Access Layer Address) 804 is assigned to each port 806 of an endnode component 802. A component can be an IPSOE, switch, or router. All IPSOE and router components must have a MAC address. A media access point on a switch is also assigned a MAC address.

One network address (e.g. IP Address) 812 is assigned to each port 806 of an endnode component 902. A component can be an IPSOE, switch, or router. All IPSOE and router components must have a network address. A media access point on a switch is also assigned a MAC address.

Each port of switch 810 does not have a link layer address associated with it. However, switch 810 can have a media access port 814 that has a link layer address 816 and a network layer address 808 associated with it.

Figure 9:
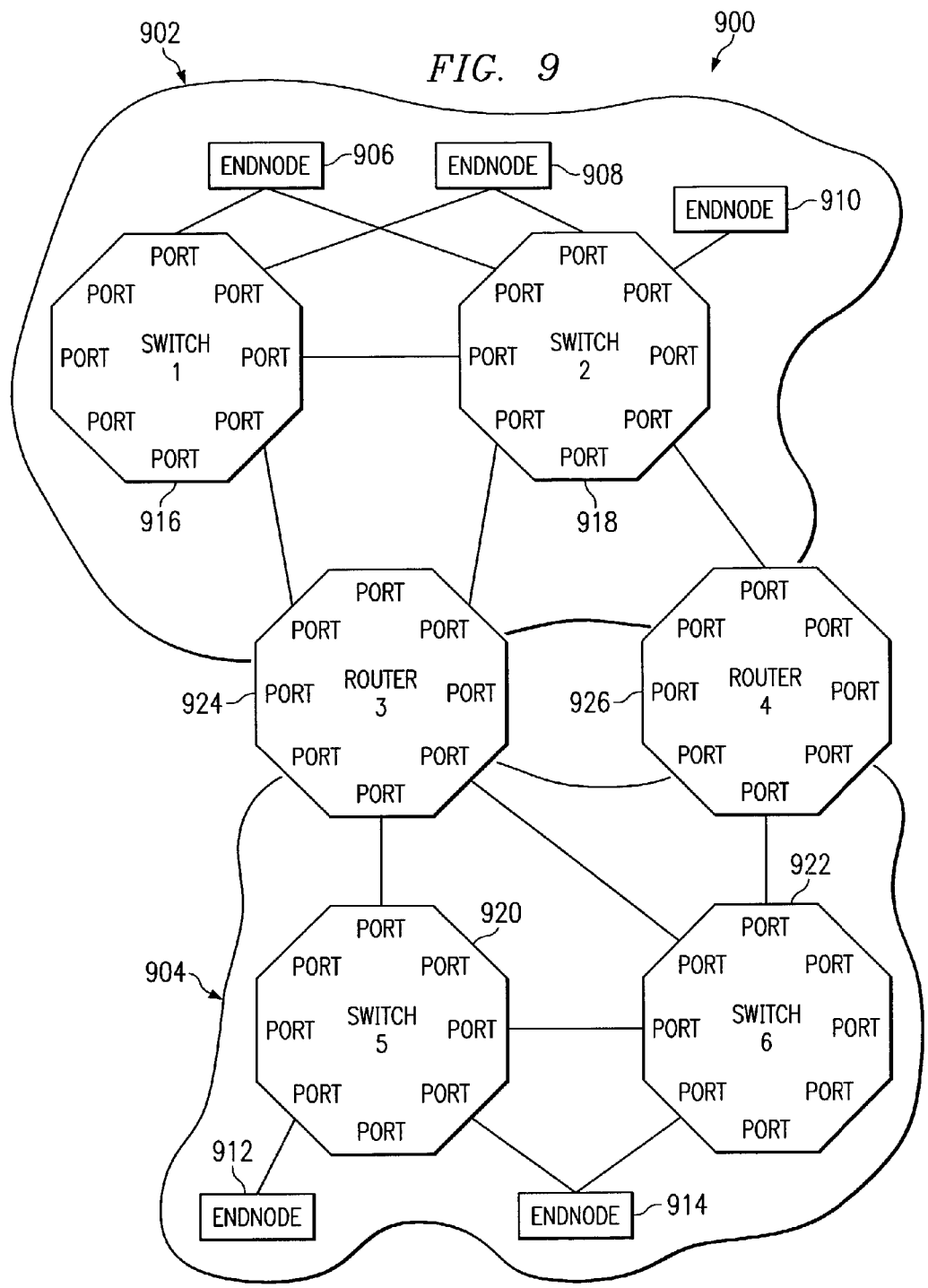
FIG. 9 is a diagram of a portion of a distributed computer system containing subnets in a preferred embodiment of the present invention.

A portion of a distributed computer system in accordance with a preferred embodiment of the present invention is illustrated in FIG. 9. Distributed computer system 900 includes a subnet 902 and a subnet 904. Subnet 902 includes host processor nodes 906, 908, and 910. Subnet 904 includes host processor nodes 912 and 914. Subnet 902 includes switches 916 and 918. Subnet 904 includes switches 920 and 922.

Routers create and connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the destination link layer address (e.g. MAC address) that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 9, for expansion too much larger systems, subnets are connected with routers, such as routers 924 and 926. The router interprets the destination network layer address (e.g. IP address) and routes the frame.

An example embodiment of a switch is illustrated generally in FIG. 3B. Each I/O path on a switch or router has a port. Generally, a switch can route frames from one port to any other port on the same switch.

Within a subnet, such as subnet 902 or subnet 904, a path from a source port to a destination port is determined by the link layer address (e.g. MAC address) of the destination host IPSOE port. Between subnets, a path is determined by the network layer address (IP address) of the destination IPSOE port and by the link layer address (e.g. MAC address) of the router port, which will be used to reach the destination's subnet.

In one embodiment, the paths used by the request frame and the request frame's corresponding positive acknowledgment (ACK) frame is not required to be symmetric. In one embodiment employing oblivious routing, switches select an output port based on the link layer address (e.g. MAC address). In one embodiment, a switch uses one set of routing decision criteria for all its input ports in the switch. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses IP Suite Offload Engine hardware through one or more queue pairs, such as the queue pairs illustrated in FIGS. 3A, 5, and 8. The client process calls an operating system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the IP net fabric must be sufficiently specified to allow devices to interoperate in a heterogeneous vendor environment.

In one embodiment, IPSOE hardware detects work queue element postings and accesses the work queue element. In this embodiment, the IPSOE hardware translates and validates the work queue element's virtual addresses and accesses the data.

An outgoing message is split into one or more data frames. In one embodiment, the IPSOE hardware adds a DDP/RDMA header, frame header and CRC, transport header and a network header to each frame. The transport header includes sequence numbers and other transport information. The network header includes routing information, such as the destination IP address and other network routing information. The link header contains the destination link layer address (e.g. MAC address) or other local routing information.

If a TCP or SCTP is employed, when a request data frame reaches its destination endnode, acknowledgment data frames are used by the destination endnode to let the request data frame sender know the request data frame was validated and accepted at the destination. Acknowledgment data frames acknowledge one or more valid and accepted request data frames. The requestor can have multiple outstanding request data frames before it receives any acknowledgments. In one embodiment, the number of multiple outstanding messages, i.e. request data frames, is determined when a queue pair is created.

Figure 10:
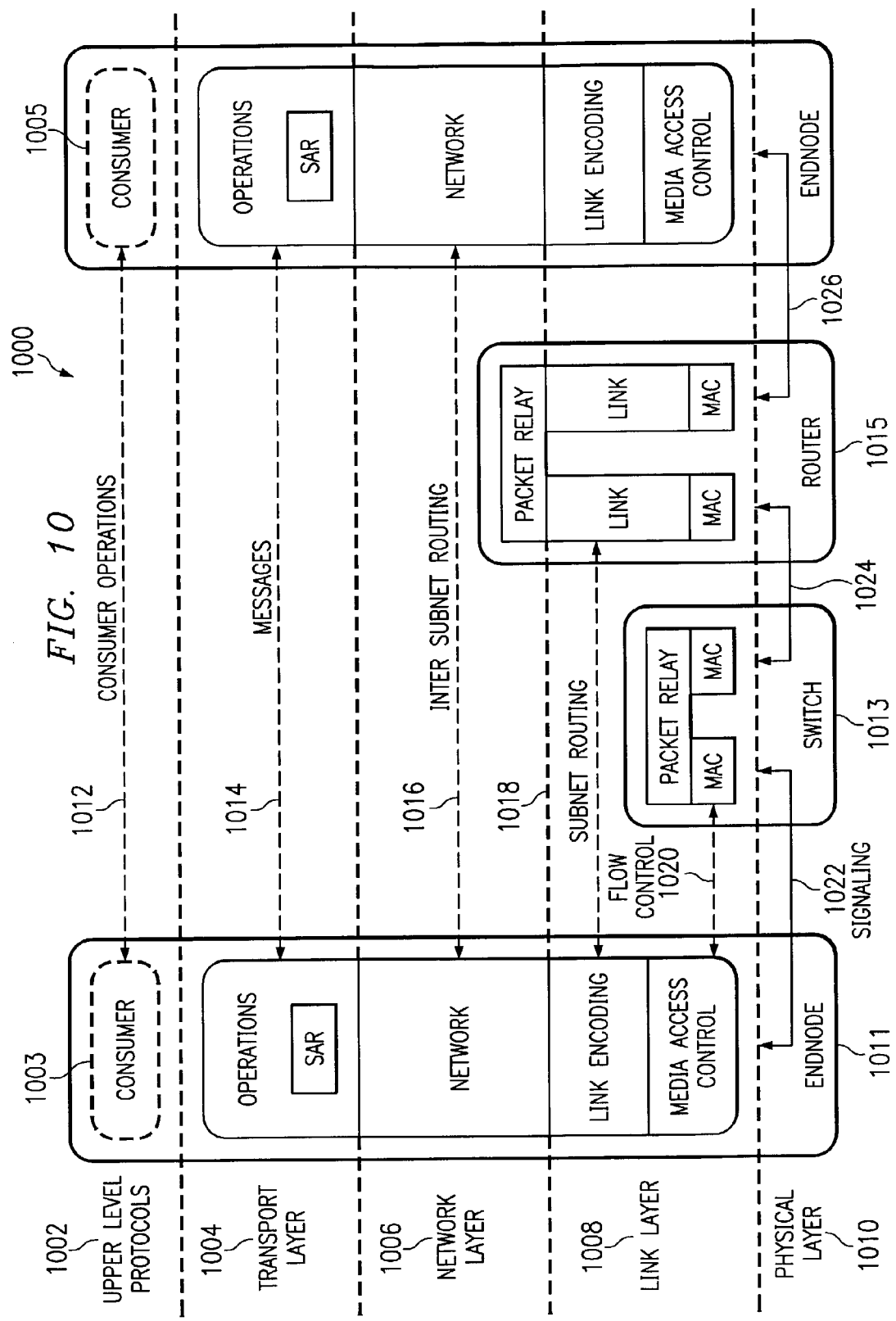
FIG. 10 is a diagram of a layered communication architecture used in a preferred embodiment of the present invention.

One embodiment of a layered architecture 1000 for implementing the present invention is generally illustrated in diagram form in FIG. 10. The layered architecture diagram of FIG. 10 shows the various layers of data communication paths, and organization of data and control information passed between layers.

IPSOE endnode protocol layers (employed by endnode 1011, for instance) include upper level protocols 1002 defined by consumer 1003, transport layer 1004; network layer 1006, link layer 1008, and physical layer 1010. Switch layers (employed by switch 1013, for instance) include link layer 1008 and physical layer 1010. Router layers (employed by router 1015, for instance) include network layer 1006, link layer 1008, and physical layer 1010.

Layered architecture 1000 generally follows an outline of a classical communication stack in order to complete consumer operations 1012 of transferring data between consumers 1003 and 1005. With respect to the protocol layers of endnode 1011, for example, upper layer protocols 1002 employs verbs to create messages at transport layer 1004. Transport layer 1004 passes messages 1014 to network layer 1006. Network layer 1006 routes frames between network subnets 1016. Link layer 1008 routes frames within a network subnet 1018. Physical layer 1010 sends bits or groups of bits to the physical layers of other devices. Each of the layers is unaware of how the upper or lower layers perform their functionality.

Consumers 1003 and 1005 represent applications or processes that employ the other layers for communicating between endnodes. Transport layer 1004 provides end-to-end message movement. In one embodiment, the transport layer provides four types of transport services as described above which are traditional TCP, RDMA over TCP, SCTP, and UDP. Network layer 1006 performs frame routing through a subnet or multiple subnets to destination endnodes. Link layer 1008 performs flow-controlled 1020, error checked, and prioritized frame delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

As discussed above, the present invention provides a mechanism for managing a send queue in a split socket stack in order to reduce the processing overhead in host processors. An Upper Layer Protocol (e.g. socket) library creates Work Queues (WQ) and Completion Queues (CQ) that are utilized by an Internet Protocol Suite Offload Engine (IPSOE) and the Upper Layer Protocol (ULP) to transfer information and carry out send operations. As consumers initiate send operations, Work Queue Entries (WQE) are created by the ULP and written to the Send Work Queue (SWQ). The ISPOE is notified of a new entry to the SWQ and it subsequently reads this entry, which contains pointers to the data that is to be sent. After the data is sent and acknowledgments are received, the IPSOE creates a Completion Queue Entry (CQE) that is written to the CQ. The CQE includes a Work Request ID that associates a given WQE to a CQE. After the CQE is written, the ULP subsequently processes the entry and removes it from the CQ, freeing up a space in both the WQ and CQ. The number of entries available in the SWQ are monitored by the ULP so that it does not overwrite any valid entries. Likewise, the IPSOE monitors the number of entries available in the CQ.

Figure 11:
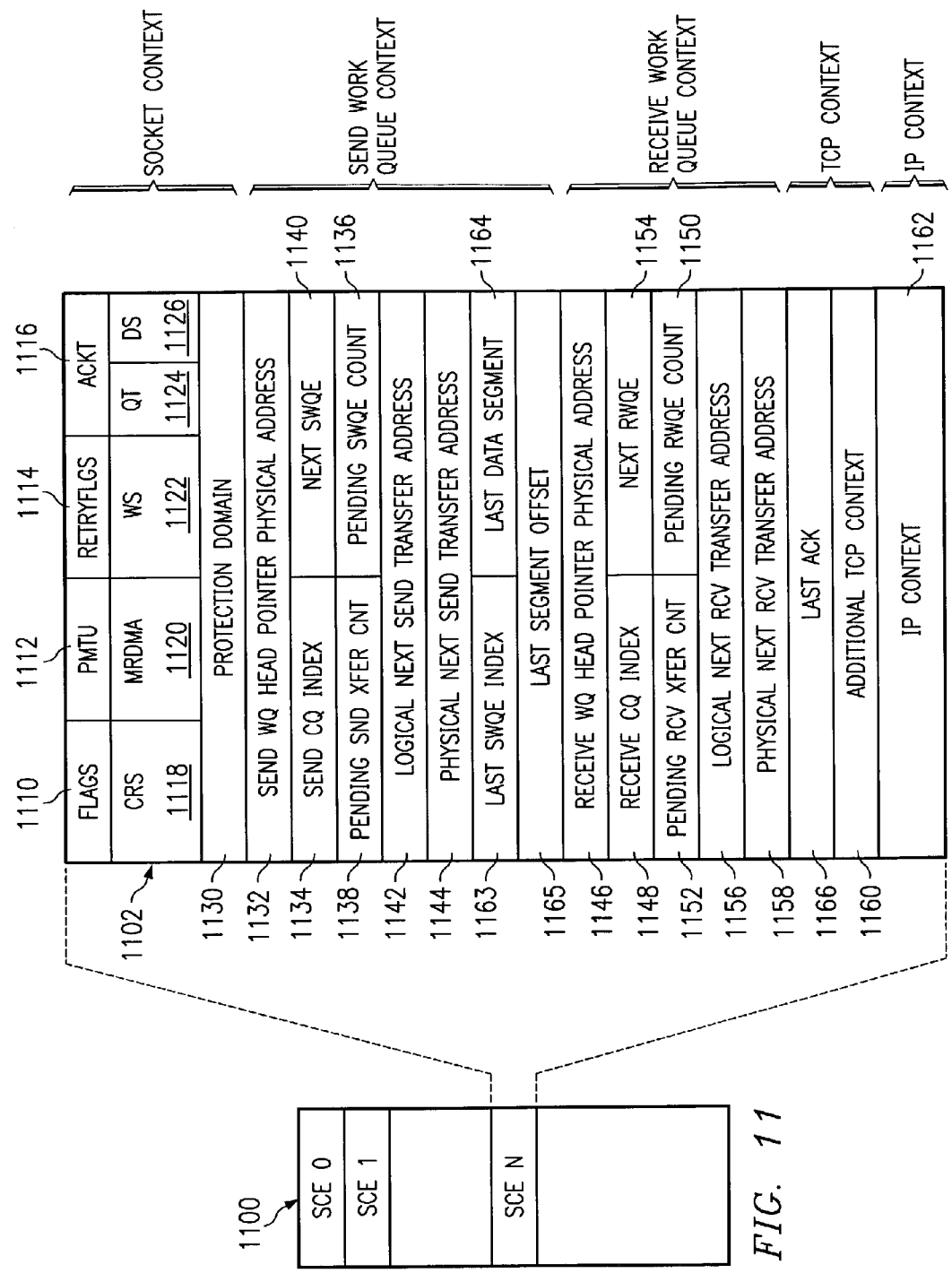
FIG. 11 is an exemplary diagram that depicts the contents of the socket context entry created for a given socket in accordance with the present invention.

FIG. 11 is an exemplary diagram that depicts the contents of an entry in a Socket Context Table in accordance with the present invention. The Socket Context Table 1100 contains a Socket Context Entry (SCE) 1102 for each work queue pair (QP). These entries contain many fields that are broken up into the Socket Context (SC), the Send Work Queue Context (SWQC), Receive Work Queue Context (RWQC), Additional TCP Context, and IP Context.

The Socket Context includes Flags 1110, which contain the state of the QP, the IP version being utilized, and the port number of the QP. The state of the QP is set by the IPSOE. The IP version and port number of the QP are set by the Consumer. The Path Maximum Transfer Unit (PMTU) field 1112 contains the maximum data payload transfer size. The Retry Flags 1114 include the number of times a WQE is retried must be retried by the IPSOE and the current number of retries that have been attempted. The latter is used by the IPSOE to keep track of the number of times the IPSOE has actually retried the WQE. The ACKT (Acknowledgment Timeout) field 1116 is the amount of time the IPSOE will wait for an acknowledgment (ACK) before marking the TCP Segment associated with the ACK as lost.

The Window Size (WS) field 1118 contains the outbound TCP/IP and inbound TCP/IP window sizes, each in number of bytes, for the connection. The Maximum Remote Direct Memory Access (MRDMA) field 1120 is the maximum number of outstanding RDMA Read Requests from the remote socket. The pending receive count (PRC) field 1122 is the number of receive packets that are pending acknowledgments (ACKs). The Queue Pair Type (QT) field 1124 describes the type of service associated with the QP (e.g. Sockets, iSCSI, DAFS, etc . . . ). The Data Segments (DS) field 1126 is the maximum number of data segments per WQE. The protection domain (PD) field 1130 identifies the Protection Domain associated with the ULP (in one embodiment, it is set to the process ID and is used to ensure that the current operations have authority to access the memory region being read).

The send and receive work queue contexts contain similar data except that they point to different queues. The Send Work Queue Head Pointer Physical Address field 1132 points to the head of the circular work queue for send operations. The ULP writes to the head of the SWQ when a send is initiated. The Send CQ Index field 1134 is the index into the send completion queue for the associated QP. The Pending SQWE Count 1136 is the number of pending SWQE's in the SWQ. The Pending Send Xfer Count field 1138 is the number of pending send operations waiting for an acknowledgment from a remote node. The Next SWQE field 1140 is a pointer to the next SWQE in this SWQ to be processed. Each SWQE contains a list of Data Segments. For RDMA, each of the Data Segments contains a STag, Virtual Address and Length. The IPSOE uses the STag to translate the Virtual Address into a Physical Address. The Logical Next Send Transfer Address 1142 and Physical Next Send Transfer Address 1144 are the virtual and physical addresses (respectively) immediately following the last outbound transfer as translated via the IPSOE's memory translation and protection table.

The send work queue context also contains fields that support retransmission of lost packets, without the need for holding copies of transmitted data until the corresponding acknowledgments are received. The purpose of these fields is to maintain a correlation between send buffer locations as specified in SQWE's 1204 and the last acknowledged TCP/IP sequence number (Last Ack) in the TCP context 1166. Whereas the Next Send Transfer Addresses 1142, 1144 indicate where a transfer on a particular connection left off, the retransmission support fields (and the Last Ack) indicate the oldest sent but not acknowledged byte of source data. There are three such fields in the send work queue context. Together they indicate the byte location in the send buffer that corresponds to the Last Ack 1166 indicated in the TCP context. This will be referred to as the Last Ack Byte. The Last SWQE Index 1163 indicates the SWQE that describes the send buffer in which the Last Ack Byte is located. The Last Data Segment 1164 indicates the data segment 1220 in that SWQE in which the Last Ack Byte is located. The Last Segment Offset 1165 indicates the byte position in that Last Data Segment in which the Last Ack Byte is located. As described later, these three pieces of information together with the SACK table in the TCP Context provide the IPSOE with the information it needs to support retransmission of lost TCP/IP packets (with or without the TCP/IP SACK option enabled).

The receive work queue context has fields that are analogous to those in the send work queue context, as represented in FIG. 11 as elements 1146-1158. The TCP Context 1160 and IP Context 1162 contain information regarding the type of TCP and IP connections that are being utilized as transport mechanisms.

Figure 12:
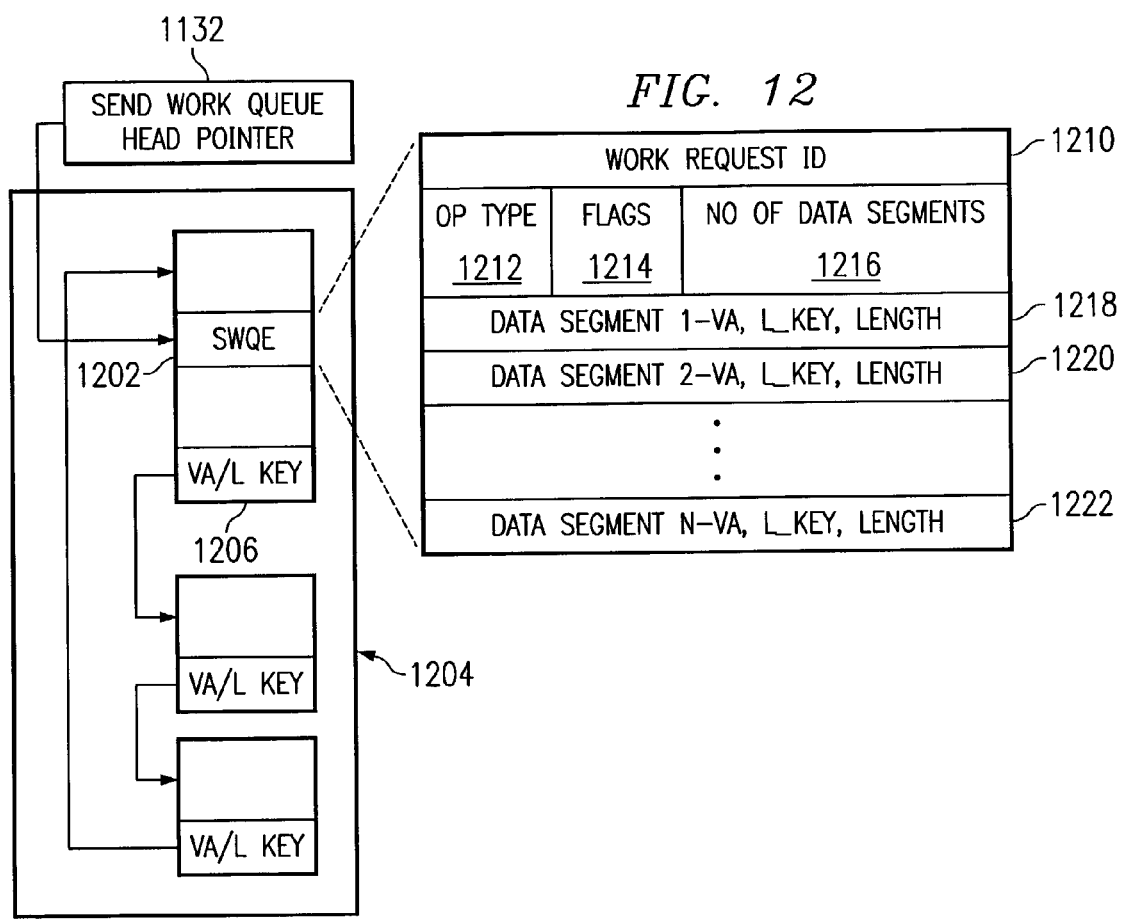
FIG. 12 is a diagram of an exemplary Work Queue Element list and details of the Work Queue Element Entries in accordance with the present invention.

When a send operation is initiated, the ULP creates one or more SQWE's 422 that are written to the SWQ pointed to by the SWQ Head Pointer 1132, as shown in FIG. 12. The SWQ 1204 is a linked list of pages of SWQEs. The last entry 1206 in each page is a pointer containing the physical address to the next page of SWQEs.

When the SWQ is created, the initial SQW free space is set in a variable maintained by the ULP, referred to as the "SWQ Credit Count". An SWQ Credit corresponds to one SQWE. As long as there is space in the SWQ (i.e. SQW Credit Count is non-zero), SWQE's can be added to the head of the list pointed to by the SWQ Head Pointer 1132. After some number of SWQE's have been added to the SWQ, the ULP notifies the IPSOE that it has done so via an "SWQ doorbell", and then clears the SQW Credit Count. In a preferred embodiment, a doorbell is a memory mapped I/O operation (MMIO). The number of SWQE's added to the SWQ are indicated to the IPSOE in the SWQ doorbell. The IPSOE adds this count to the Pending SQWE Count 1136, to track the number of pending SWQE's in the SWQ.

Returning to FIG. 12, an enlarged view of the SWQE 1202 is shown in the box having fields 1210-1222. As shown in FIG. 12, the SWQE 1202 includes a Work Request ID field 1210 which is an identifier that is used to associate WQE's with eventual CQE's. The Op Type field 1212 is the operation type. Operation types include: Send, Send with Solicited Event, RDMA Write, RDMA Read, or a Memory (e.g. Bind Memory Window) Operation. The Flags 1214 include information such as: Signaled Completion requested; Immediate Data present; and Fence requested. If the ULP requested Signaled Completion, then a Work Completion (WC) will be returned by the IPSOE when the SWQE completes. If Immediate Data is requested, then the SWQE contains data that the IPSOE must send as Immediate Data on the outbound transfer. Finally, if the SWQE contains a Fence, then the IPSOE must wait for the SWQE to complete, before processing the next SWQE. The Fence operation can be used for Memory and RDMA Read Operations.

The Number of Data Segments field 1216 is the quantity of Data Segments that are to be transmitted. Each Data Segment 1218-1222 contains a STag, Virtual Address, and Length. The IPSOE's Memory Translation and Protection Table uses these 3 fields to access the data referenced by the data segment. In an iSCSI environment this list of addresses is replaced by a pointer to the iSCSI command which will contain the destination IP address and port number along with a list of physical addresses of data that is to be transmitted.

Figure 13:
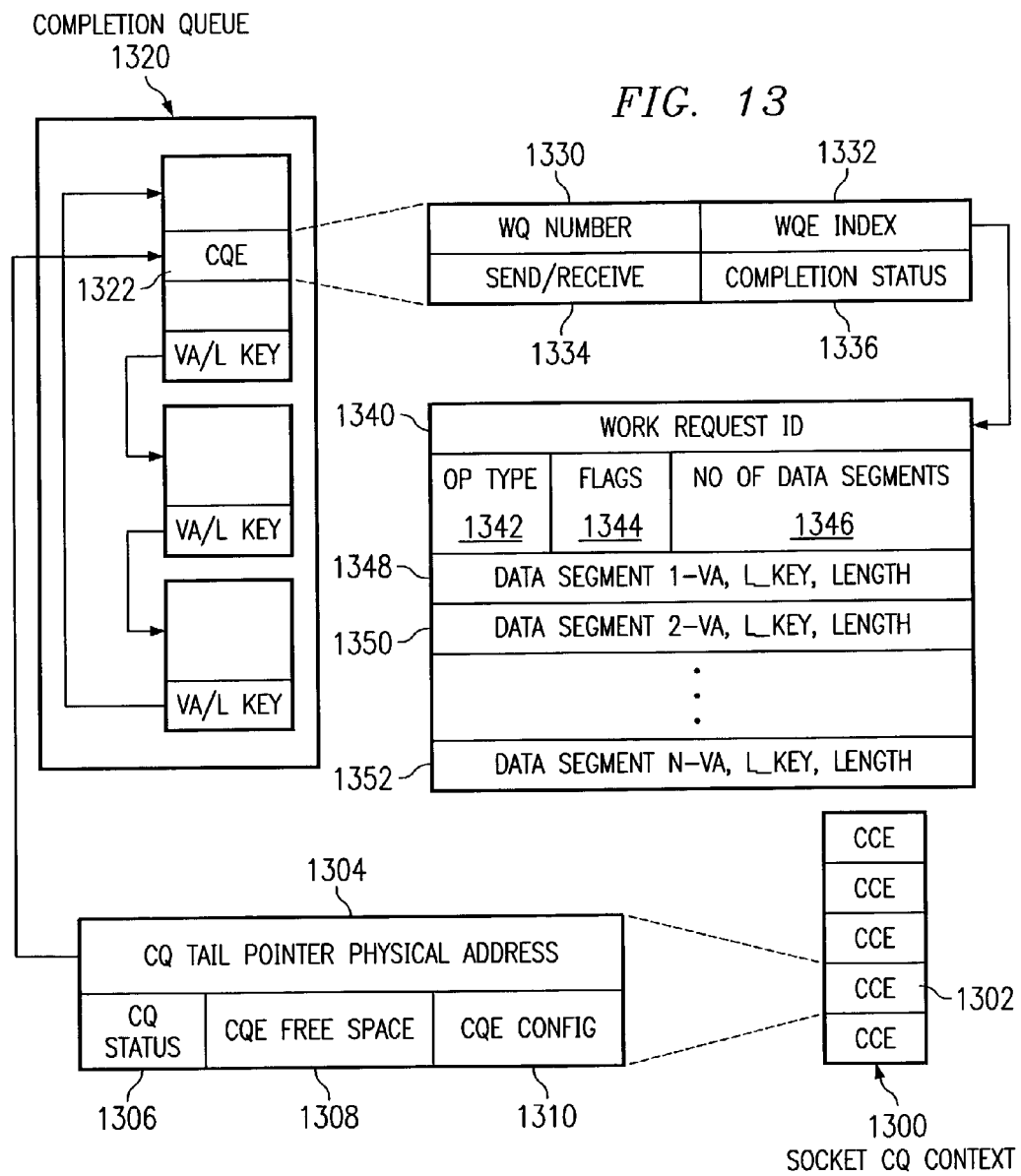
FIG. 13 is a diagram of an exemplary Completion Queue Context and details of the Completion Queue Element Entries in accordance with the present invention.

After the data pointed to by the list of addresses in the SWQEs is transmitted by the IPSOE hardware, described previously, the IPSOE must notify the consumer that the work is completed. This is carried out through the use of a completion queue (CQ). CQ's are created by the ULP for each IPSOE. At the time of creation, the size of the CQ is set (i.e. number of CQE's the CQ can hold). FIG. 13 shows the CQ context along with the detail of the CQE. The Socket Completion Queue Context Table 1300 contains Completion Context Entries (CCE) such as 1302 associated with a given WQ. Each CCE 1302 contains a CQ Tail Pointer Physical Address field 1304 which is a pointer to the address of an entry such as 1322 in the circular linked list, which is the CQ 1320. This is a linked list of CQE pages where the last entry in each page is a pointer to the next page of the list.

Each CQE contains a pointer to the send operation that completed. This is accomplished by utilizing a WQ Number field 1330 and a WQE index field 1332 that point to the WQE that has completed. The Send/Receive field 1334 of the CQE identifies the type of operation (Send WQE or Receive WQE) that completed and the Completion Status field 1336 contains information as to whether the WQE completed successfully or unsuccessfully.

The WQE that is pointed to is shown in 1340-1352. For a CQE that is associated with a Send WQE, all the fields contained in the Send WQE are contained in the CQE. Similarly, for a CQE that is associated with a Receive WQE, all the fields contained in the Receive WQE are contained in the CQE. The Work Request ID field 1340 is a 64-bit identifier that is used to associate this completion queue entry back to a specific WQE.

Figure 16:
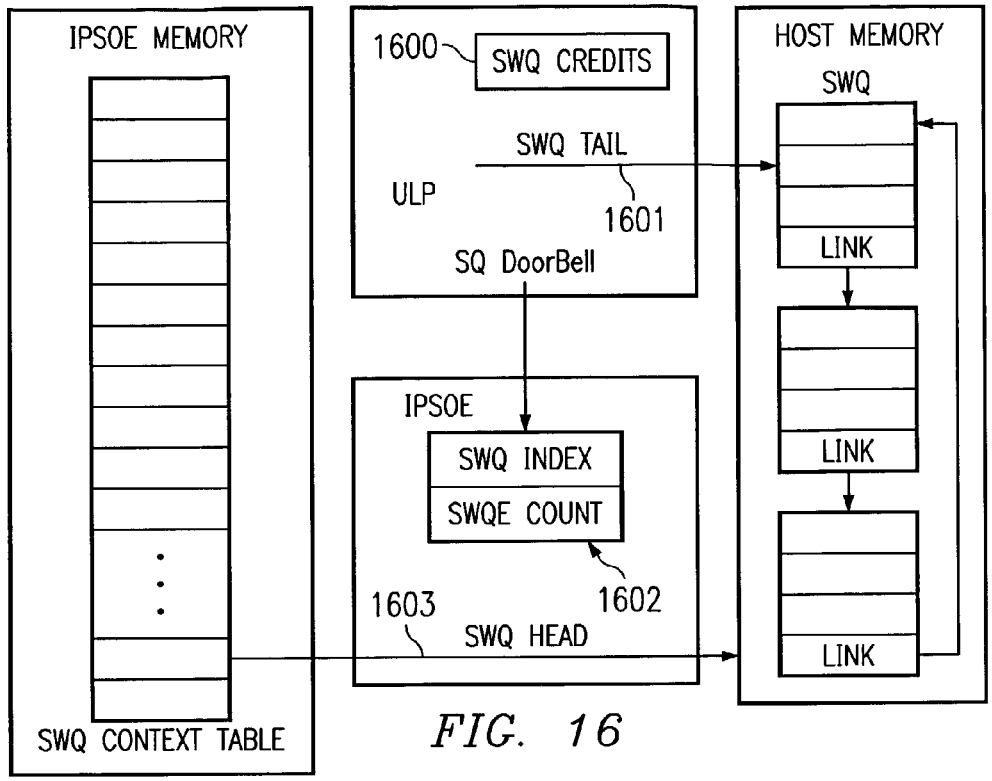
FIG. 16 is an exemplary diagram illustrating a send queue doorbell mechanism for informing the IPSOE of a send work queue entry count.

As operations complete, the IPSOE writes to the tail of the CQ using the CQ Tail Pointer 1304, assuming the CQE Free Space count 1308 in the Socket CQ Context 1300 indicates that there is available free space. CQE Free Space is a count of the number of free entries in the CQ. If no space is available CQ (i.e. CQE Free Space is zero) then an interrupt will be issued up to the ULP. At that point the ULP may increase the size of the CQ and notify the IPSOE how many entries have been added to the CQ. The IPSOE responds by adjusting the CQE Free Space count up by the indicated amount. The ULP keeps track of the last CQE that it read and when the next entry becomes valid. The ULP ensures that the operation completed successfully and removes CQE from the head of the CQ by invalidating the entry and advancing a software CQ head pointer that it maintains. The ULP also maintains counts of the number of CQE's it has removed from the CQ, both in total, and on a per WQ basis. The per WQ counts are maintained in "SWQ Credit Count" variables 1600, as shown in FIG. 16, managed by ULP software. SWQ Credit Count conservatively indicates to the ULP how much free space there is in the corresponding WQ. When the ULP issues an SWQ Doorbell 1602 to the IPSOE, it passes the corresponding SWQ Credit Count to the IPSOE in the doorbell as an SWQE Count, and then clears the SWQ Credit Count.

Figure 17:
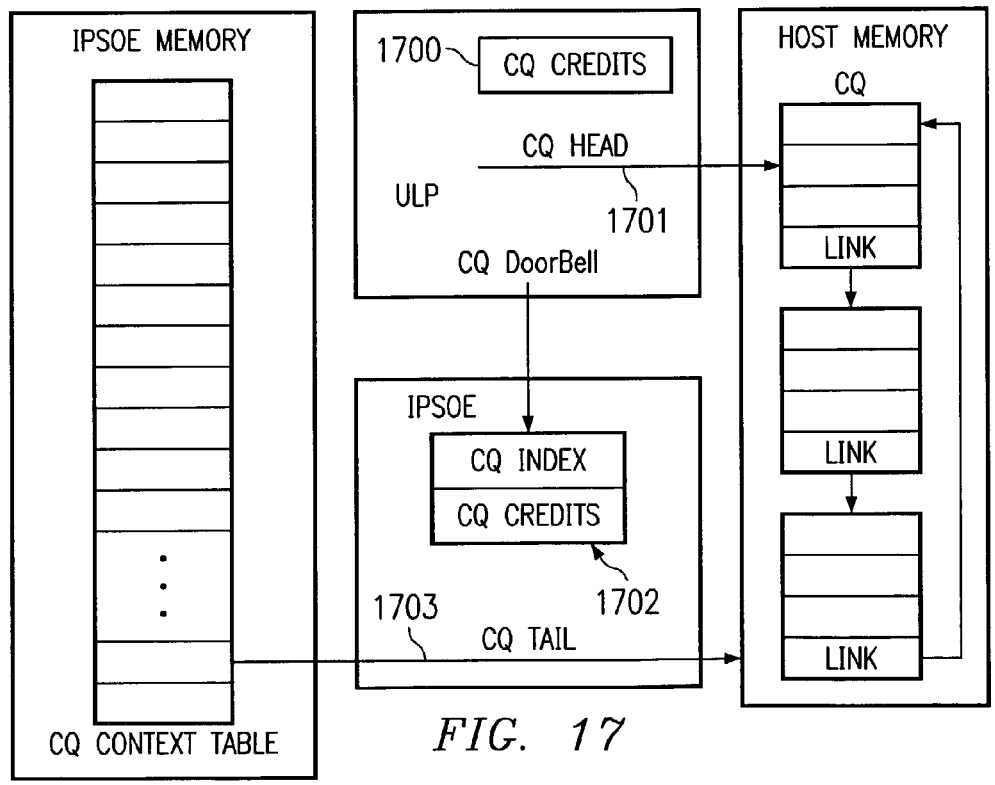
FIG. 17 is an exemplary diagram illustrating a completion queue doorbell mechanism for informing the IPSOE of completion queue credits.

The total number of CQE's the ULP removes from a CQ are maintained in a "CQ Credit Count" variable 1700, as shown in FIG. 17, managed by the ULP in software. The ULP indicates to the IPSOE how many CQE's it has removed from a CQ by passing the CQ Credit Count to the IPSOE in a "CQ Doorbell" 1702. A CQ doorbell is an MMIO like the SWQ Doorbell. However, instead of indicating how many SWQE's have been added to a SWQ, a CQ doorbell indicates how many CQE's the ULP has removed from a specified CQ. When the ULP issues a CQ Doorbell to the IPSOE, it passes the CQ Credit Count to the IPSOE in the doorbell, and then clears the CQ Credit Count. The IPSO adds the CQ Credits to the CQ Free Space count 1308 of the Socket CQ Context 1300 (that is also specified in the CQ doorbell). When the IPSOE adds one or more CQE's to the tail of a CQ 1703, it decreases the CQ Free Space Count by that amount. Hence the CQ Free Space count conservatively indicates to the IPSOE the amount of free space in the corresponding CQ.

Note the implicit flow of SWQ and CQ Credits between the ULP and the IPSOE. As the ULP consumes CQEs from a CQ, it acquires CQ and SWQ Credits. As the ULP issues SWQ Doorbells to the IPSOE it consumes SWQ Credits, and implicitly passes them to the IPSOE. The IPSOE in turn implicitly returns SWQ Credits to the ULP as it posts CQE's in a CQ. Conversely, the IPSOE implicitly consumes CQ Credits as it posts CQE's to a CQ. The ULP explicitly returns CQ Credits to the IPSOE in CQ Doorbells.

Now turning to FIG. 14 which is a flowchart that outlines an exemplary process for creating a queue pair. Step 1410 starts the flowchart. The consumer initiates the creation of queue pair by calling the ULP to create a queue pair (step 1400). 1402 the ULP then allocates and pins memory for the queue pair context or socket context as depicted in FIGS. 11 and 12 (Step 1402). Once the QP is created including the setting attributes such as the number of WQEs allowed in the QP, then control is returned to the consumer (step 1404) and the process ends (step 1406).

FIG. 15 is a flowchart outlining an exemplary operation of the present invention for send transactions. As shown in FIG. 15 the consumer creates a number of send work requests 1500 and hands them off to the ULP 1502. The ULP converts the work requests into SWQE's 1504 as depicted in FIG. 12. The ULP writes the SWQE's 1202, to the address pointed to by the Send WQ Head Pointer Physical Address 1132 and then updates this pointer 1506. The ULP notifies the IPSOE via a SWQ Doorbell how many SWQE's were posted to the SWQ, and clears the associated SWQ Credit Count.

The SWQE is processed by the IPSOE hardware by transmitting the data in the data segments pointed to by the Data Segment Addresses 1218-1222 within the SWQE 1202 1510. Once the entire SWQE has been processed, then the IPSOE creates a CQE 1512, and decrements the Pending SWQE Count. The IPSOE writes the CQE into the CQ at the address pointed to by the CQ Tail Pointer Physical Address 1304, updates this pointer to the next available CQE 1514, and decrements the CQE Free Space count. The IPSOE then notifies the ULP of a new CQE 1516. This can be done by several methods with one implementation being an interrupt polling mechanism between the IPSOE and the ULP. Once notified, the ULP processes the CQE's it removes from the CQ and updates the corresponding CQ and SWQ Credit counts 1518. At this point the entire send operation has ended 1520.

Retransmission support in the IPSOE is invoked on the occurrence of two different event types. One event is the arrival of a TCP/IP ACK. When this occurs, the IPSOE updates the retransmission support fields in the SWQ Context 1163, 1164, 1165. The other event is when the TCP timer expires, and all the TCP contexts are checked for forward progress.

FIG. 18 is a flowchart that details the steps the IPSOE takes when a TCP/IP ACK arrives. Initially, these fields are set to zero (step 1800). When an ACK is received, the transmit engine adds the length of the Last Data Segment minus the Last Segment Offset to the Last ACK (step 1801). If the result is less than the ACK just received (step 1802), the difference between the length of the Last Data Segment and the Last Segment Offset are added to the Last ACK, the Last Segment Offset is set to zero, and the Last Data Segment is updated to point to the next consecutive data segment (step 1803). If that happens to fall in the next WQE (step 1804), then the Last SWQE Index is set to point to the next consecutive SWQE in the list, and Last Data Segment is set to zero (step 1805). These steps are repeated using the new Last ACK, Last WQE Index, Last Data Segment, and Last Segment Offset, until a point is reached where the sum of the Last Data Segment and the Last ACK is greater than the ACK just received (step 1802). At that point the difference between Last ACK and the received ACK is added to the Last Segment Offset, and the Last ACK is set equal to the ACK just received (step 1806).

The above steps maintain a tight correlation between the TCP/IP sequence number indicted in the arriving ACK's and the corresponding byte position in the send buffers pointed to by the SWQE's in the SWQ. Hence when the TCP timer expires, the IPSOE knows where retransmission should start from. When the TCP timer expires, if no ACK's had arrived since the last time the timer expired, the IPSOE goes into a retransmit mode. If the SACK option is not enabled, the IPSOE retransmits everything on the timed out socket connection starting from the send buffer byte position indicated by the three retransmission support fields in the SWQ Context 1163, 1164, 1165, to the send buffer byte position just prior to the Next Send Transfer Address 1142, 1144. If the TCP/IP SACK option is enabled, the IPSOE skips over data corresponding to the TCP/IP sequence number intervals (i.e. SACK intervals) recorded in the SACK table of the TCP Context 1160 (see RFC 2018 for details on the TCP/IP SACK option).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing a work queue, comprising:
creating a work queue entry in a work queue in response to a request to send data;
sending a notification to the Internet Protocol Suite Offload Engine (IPSOE)notifying the IPSOE of the creation of the work queue entry;
transmitting, via the IPSOE, the data associated with the work queue entry to a destination device in response to receiving the notification; and
processing a completion queue entry in a completion queue in response to receiving a notification that the completion queue entry has been created by the IPSOE in response to receiving an acknowledgment of receipt of the data associated with the work queue entry from the destination device.

2. The method of claim 1, wherein the completion queue entry includes a work request ID that associates the work queue entry to the completion queue entry.

3. The method of claim 1, further comprising:
monitoring a number of entries available in the work queue so that valid work queue entries are not overwritten.

4. The method of claim 3, wherein monitoring a number of entries available in the work queue includes:
receiving from an upper layer protocol library, a number of completion queue entries processed by the upper layer protocol library for the work queue; and
determining a number of available work queue entries based on the number of completion queue entries processed by the upper layer protocol library for the work queue.

5. The method of claim 1, further comprising:
monitoring a number of entries available in the completion queue so that valid completion queue entries are not overwritten.

6. The method of claim 5, further comprising:
sending an interrupt from the IPSOE to an upper layer protocol (ULP) library if the number of entries available in the completion queue is zero.

7. The method of claim 6, further comprising:
increasing a size of the completion queue in response to the ULP library receiving an interrupt from the IPSOE.

8. The method of claim 5, wherein monitoring a number of entries available in the completion queue includes:
receiving, from an upper layer protocol library, a total number of completion queue entries processed by the upper layer protocol library for the completion queue; and
determining a number of available completion queue entries based on the total number of completion queue entries processed by the upper layer protocol library for the completion queue.

9. The method of claim 1, wherein the work queue entry is created by an upper layer protocol library in response to a receiving a send work request from a consumer.

10. The method of claim 1, wherein the completion queue entry is processed by an upper layer protocol library that both processes the completion queue entry and removes the completion queue entry from the completion queue subsequent to processing the completion queue entry.

11. The method of claim 1, further comprising:
maintaining status information regarding the work queue, completion queue, work queue entry and completion queue entry in a socket context data structure.

12. A computer program product in a computer readable medium for managing a work queue, comprising:
first instructions for creating a work queue entry in a work queue in response to a request to send data;
second instructions for sending a notification to the Internet Protocol Suite Offload Engine (IPSOE) notifying the IPSOE of the creation of the work queue entry;
third instructions for transmitting, via the IPSOE, the data associated with the work queue entry to a destination device in response to receiving the notification; and
fourth instructions for processing a completion queue entry in a completion queue in response to receiving a notification that the completion queue entry has been created by the IPSOE in response to receiving an acknowledgment of receipt of the data associated with the work queue entry from the destination device.

13. The computer program product of claim 12, wherein the completion queue entry includes a work request ID that associates the work queue entry to the completion queue entry.

14. The computer program product of claim 12, further comprising:
fifth instructions for monitoring a number of entries available in the work queue so that valid work queue entries are not overwritten.

15. The computer program product of claim 14, wherein the fifth instructions for monitoring a number of entries available in the work queue include:
instructions for receiving, from an upper layer protocol library, a number of completion queue entries processed by the upper layer protocol library for the work queue; and
instructions for determining a number of available work queue entries based on the number of completion queue entries processed by the upper layer protocol library for the work queue.

16. The computer program product of claim 12, further comprising:
fifth instructions for monitoring a number of entries available in the completion queue.

17. The computer program product of claim 16, further comprising:
sixth instructions for sending an interrupt from the IPSOE to an upper layer protocol (ULP) library if the number of entries available in the completion queue is zero.

18. The computer program product of claim 17, further comprising:
seventh instructions for increasing a size of the completion queue in response to the ULP library receiving an interrupt from the IPSOE.

19. The computer program product of claim 16, wherein the fifth instructions for monitoring a number of entries available in the completion queue includes:
instructions for receiving, from an upper layer protocol library, a total number of completion queue entries processed by the upper layer protocol library for the completion queue; and
instructions for determining a number of available completion queue entries based on the total number of completion queue entries processed by the upper layer protocol library for the completion queue.

20. The computer program product of claim 12, wherein the work queue entry is created by an upper layer protocol library in response to a receiving a send work request from a consumer.

21. The computer program product of claim 12, wherein the completion queue entry is processed by an upper layer protocol library that both processes the completion queue entry and removes the completion queue entry from the completion queue subsequent to processing the completion queue entry.

22. The computer program product of claim 12, further comprising:
fifth instructions for maintaining status information regarding the work queue, completion queue, work queue entry and completion queue entry in a socket context data structure.

23. A data processing system for managing a work queue, comprising:
means for creating a work queue entry in a work queue in response to a request to send data;

means for sending a notification to the Internet Protocol Suite Offload Engine (IPSOE)notifying the IPSOE of the creation of the work queue entry;

means for transmitting the data associated with the work queue entry to a destination device in response to receiving the notification; and means for creating a completion queue entry in a completion queue in response to receiving an acknowledgment of receipt of the data associated with the work queue entry from the destination device.

24. A method, in a data processing system, for managing a work queue, comprising:

creating a work queue entry in a work queue in response to a request to send data;

sending a notification to the Internet Protocol Suite Offload Engine (IPSOE) notifying the IPSOE of the creation of the work queue entry;

transmitting, via the IPSOE, the data associated with the work queue entry to a destination device in response to receiving the notification; and processing a completion queue entry in a completion queue in response to receiving a notification that the completion queue entry has been created by the IPSOE in response to receiving an acknowledgment of receipt of the data associated with the work queue entry from the destination device, wherein the work queue entry and completion queue entry include at least one of a TCP/IP data segment, IPSec data segment, iSCSI data segment, RDDP data segment, or Ethernet frame data segment.

25. The method of claim 24, wherein work queue pairs in the IPSOE support one or more of the following data segment types: TCP/IP data segments, IPSec data segments, iSCSI data segments, Ethernet frame data segments, or RDDP data segments.

26. The method of claim 24, wherein a data segment of the work queue entry references one of a portion of a memory region previously registered with an adapter or a portion of a memory window previously created with the adapter.

27. The method of claim 24, wherein a memory region and work queue pair are required to be associated with a same protection domain to allow a data segment of the work queue entry to reference the memory region.

28. The method of claim 24, wherein a memory window and work queue pair are required to be associated with the same protection domain to allow a data segment of the work queue entry to reference the memory window.

* * * * *